(12) United States Patent
Quintero Rozo et al.

(10) Patent No.: US 11,127,521 B2
(45) Date of Patent: Sep. 21, 2021

(54) POLYMERIC TANK FOR HOUSING POWER COMPONENTS

(71) Applicant: Siemens Aktiengesellschaft, Munich (DE)

(72) Inventors: William Quintero Rozo, Bogotá-Toberín (CO); Samuel Carvajal Cerinza, Bogotá-Modelo Norte (CO); John Jaime Velez Rodriguez, Cota-Cundinamarca (CO)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/645,133

(22) PCT Filed: Sep. 20, 2017

(86) PCT No.: PCT/US2017/052410
§ 371 (c)(1),
(2) Date: Mar. 6, 2020

(87) PCT Pub. No.: WO2019/059899
PCT Pub. Date: Mar. 28, 2019

(65) Prior Publication Data
US 2020/0312518 A1 Oct. 1, 2020

(51) Int. Cl.
*H01F 27/06* (2006.01)
*H01F 27/04* (2006.01)
(Continued)

(52) U.S. Cl.
CPC ............ *H01F 27/06* (2013.01); *H01F 27/04* (2013.01); *H01F 27/36* (2013.01); *H02B 5/02* (2013.01)

(58) Field of Classification Search
CPC ...................................................... H01F 27/06
(Continued)

(56) References Cited

U.S. PATENT DOCUMENTS 2,816,947 A * 12/1957 Leightner ............... H01F 27/04
174/18
3,482,108 A * 12/1969 Steinmayer ............ H01F 27/06
307/17
(Continued)

FOREIGN PATENT DOCUMENTS

EP          3056406 A1    8/2016
JP       2008205105 A    9/2008
(Continued)

OTHER PUBLICATIONS

PCT International Search Report and Written Opinion of International Searching Authority dated Nov. 29, 2017 corresponding to PCT International Application No. PCT/US2017/054210 filed Sep. 20, 2017.
(Continued)

*Primary Examiner* — Stanley Tso

(57) ABSTRACT

A polymeric tank for housing power components in a dry or fluid filled environment is disclosed. A mounting receptacle and plug pair used to secure the power components within the interior walls of the tank. The mounting receptacle configured to be an integral part of the interior wall. A permeable shield is insertable within the interior walls of the tank to safeguard against electromagnetic radiation.

4 Claims, 13 Drawing Sheets

(51) Int. Cl.
   *H01F 27/36* (2006.01)
   *H02B 5/02* (2006.01)
(58) Field of Classification Search
   USPC .......................................................... 174/384
   See application file for complete search history.

(56) References Cited

U.S. PATENT DOCUMENTS

| | | | |
|---|---|---|---|
| 5,681,010 A | 10/1997 | Jensen | |
| 5,681,015 A | 10/1997 | Kull | |
| 5,736,915 A * | 4/1998 | Goedde | H01F 27/12 |
| | | | 336/55 |
| 6,227,625 B1 | 5/2001 | Gaughan | |
| 6,236,185 B1 | 5/2001 | Hines et al. | |
| 2010/0130124 A1 | 5/2010 | Teeter et al. | |
| 2014/0009886 A1 | 1/2014 | Moon et al. | |
| 2014/0263860 A1 | 9/2014 | Iden et al. | |
| 2014/0327507 A1 | 11/2014 | Tsuchiya et al. | |

FOREIGN PATENT DOCUMENTS

| | | | | |
|---|---|---|---|---|
| JP | 3149090 U | 3/2009 | | |
| WO | WO 2017/063669 | * 10/2015 | ............. | H01F 27/02 |

OTHER PUBLICATIONS

Extended European Search Report dated Mar. 9, 2021 corresponding to EP Application No. EP17925685.4 filed Mar. 17, 2020.

* cited by examiner

POLYMERIC TANK FOR HOUSING POWER COMPONENTS

FIELD

The present disclosure relates to a polymeric tank for housing a variety of electromagnetic components such as transformers, reactors, voltage regulators and other related electromagnetic components usable in either a dry or fluid filled environment.

BACKGROUND

From the generating station to the consumer, several power distribution components are used to transfer safe and reliable power to the end user. Distribution transformers for example provide a means of stepping down voltages from high voltage distribution power lines to usable voltages to homes, and commercial enterprises.

Distribution transformers are specifically made to meet the demands of its operating environment. For example, distribution transformers can be mounted on poles in non-urban environments as well as on customized platforms or pads and underground vaults in more urban surroundings. Based the voltage class and on the specific needs of the application, distribution transformers maybe housed in liquid-immersed or dry-type housings and may be constructed as single or multi-phase transformers.

Often, distribution transformers are located at a service loop, where power lines run from a utility pole to a customer's premises. The number of customers fed from a single distribution transformer often varies on the number of customers within a given location and on the specific needs of the application. In an industrial application, there may be several distribution transformers dedicated to specific industrial complexes, while alternatively, a single distribution transformer may be used to feed power to several rural homes.

Pole mounted and pad mounted distribution transformers convert primary high voltage from overhead or underground power distribution lines to a lower secondary voltage lines at a customer's premises. Depending on the power distribution standards, in a particular country, the design of the distribution transformer may incorporate the use of one or more phases and the use of a neutral line. In the United States, single phase transformers are most often used to connect from overhead power lines to individual consumers. Often the distribution transformers incorporate the use of one or two bushings when connected in a wye or delta phase configuration respectively. These bushings are normally placed on top of the transformer tank while the secondary or low voltage terminals are connected to the sides of the transformer tank for ease of access.

To render distribution transformers as well as other distribution equipment safe and reliable, enclosures for such power distribution equipment have been mostly protected by metallic housing that is subject to corrosion and subject to the potential hazard of an internal flashover between the windings of the transformer for example, and the inner surface of the metal housing. In order to mitigate flashovers, from the windings and other power distribution components that may be housed therein, designers of such power distribution equipment provide significant spacing between the power distribution equipment and the inner surface of the metallic housing. Moreover, and as a failsafe measure, some housing for these electronic components utilizes dielectric oil in order to increase the dielectric constant to minimize the potential for flashovers.

When power components are filled with dielectric fluids and gases, they perform an insulative function. The power components housed in a tank as well as other power related components attached to the housing are often at various voltage potentials. The dielectric fluids and gases function to prevent the current flow between power components and within and outside of the tank having different voltage potentials. Under certain circumstances air alone is insufficient to stem the flow of an electric current. It should be noted that when referring to power components, it is intended to mean any and all power transmission and distribution components and other electronic equipment capable of being housed.

Conventional medium and high voltage containers or tanks provide an enclosure to house a variety of electromagnetic equipment in either a dry or fluid filled environment.

In a fluid-filled environment, power components are immersed in a fluid, gas or a combination thereof to achieve electrical insulation from neighboring power components and to keep such power components relatively cool. More specifically, medium and high voltage equipment is often housed in hermetically sealed metal containers that are heavy and often require customized platforms for installation. Moreover, such metal containers are often difficult to manufacture and are subject to corrosion when exposed to various weather conditions—even steel housings are susceptible to corrosion.

The manufacture of steel tanks for example, often require the use of specialized reinforcement structures such as girders welded to side walls to maintain structural integrity and to withstand overpressure and vacuum conditions which may develop in these tanks. However, the use of such reinforcement structures or girders unnecessarily adds to the weight, cost and manufacturing complexities to these tanks.

Accordingly, power components in such housings or tanks have for the most part failed to establish a safe, reliable, easily manufacturable means of locating and securing the power components within power component housing. Acts of nature, transportation and installation of such equipment often result in the movement of internal power components that may render such installation unsafe and unreliable.

Moreover, and especially with pole mounted transformers, the potential for dislodging poles from their intended position and orientation due to earth quakes, severe storms, hurricanes and vehicle accidents is significant and measures must be taken to minimize such dangers.

Such designs are often bulky and larger than necessary just to accommodate the power components while keeping it at a safe distance from potential flashover contact points. Moreover, the use of dielectric oil in such steel enclosures further adds considerable weight, rendering transportation and installation more difficult.

It is an object of the present invention to provide a housing that secures power components in their designated location and provides an added level of security from potential hazards.

It is another object of the present invention to provide a housing that is useable in either a dry-type or fluid filled environment for these power components.

It is another object of the present invention to maintain the electromagnetic radiation at safe levels.

It is another object of the present invention to minimize difficulties and costs of manufacturing a housing for power related equipment.

Another object of the present invention is to provide a housing for power components that is made from a non-corrosive, non-conductive and non-magnetic material.

And yet still, another object of the invention is to provide a multi-purpose housing usable on poles, and platforms as well as underground vaults.

SUMMARY

According to a first aspect of the present invention, a power component housing is provided for containing and facilitating the installation of such power components. The housing comprises the use of one or more mounting receptacle and plug pairs as a means of connecting the power components to the interior walls(s) of the housing so as to provide an easier means of installing and securing such power components.

In another aspect of the invention, a power component housing is provided which uses a high permeability shield to protect the environment outside of the housing from electromagnetic radiation.

According to another aspect, the power component housing is provided with a means of readily installing high voltage bushings and low voltage terminals. The high voltage bushings and low voltage terminals are connected by preferably polymeric protuberances integral to the polymeric walls and top cover.

According to another aspect of the invention, a power component housing is provided which provides a means to transport and secure the entire housing and power components in place. The polymeric housing may be transported and secured by the use of one or more side mounts that are preferably integral to the exterior walls of the housing walls.

According to another aspect of the invention, a component power housing is provided which is capable of facilitating power component removal as well as power component installation and protection.

DETAILED DESCRIPTION

Reference will now be made in detail to the various embodiments of this disclosure, examples of which are illustrated in the accompanying drawings. Wherever possible, the same reference numbers will be used throughout the drawings to refer to the same or like parts.

Figure 1:
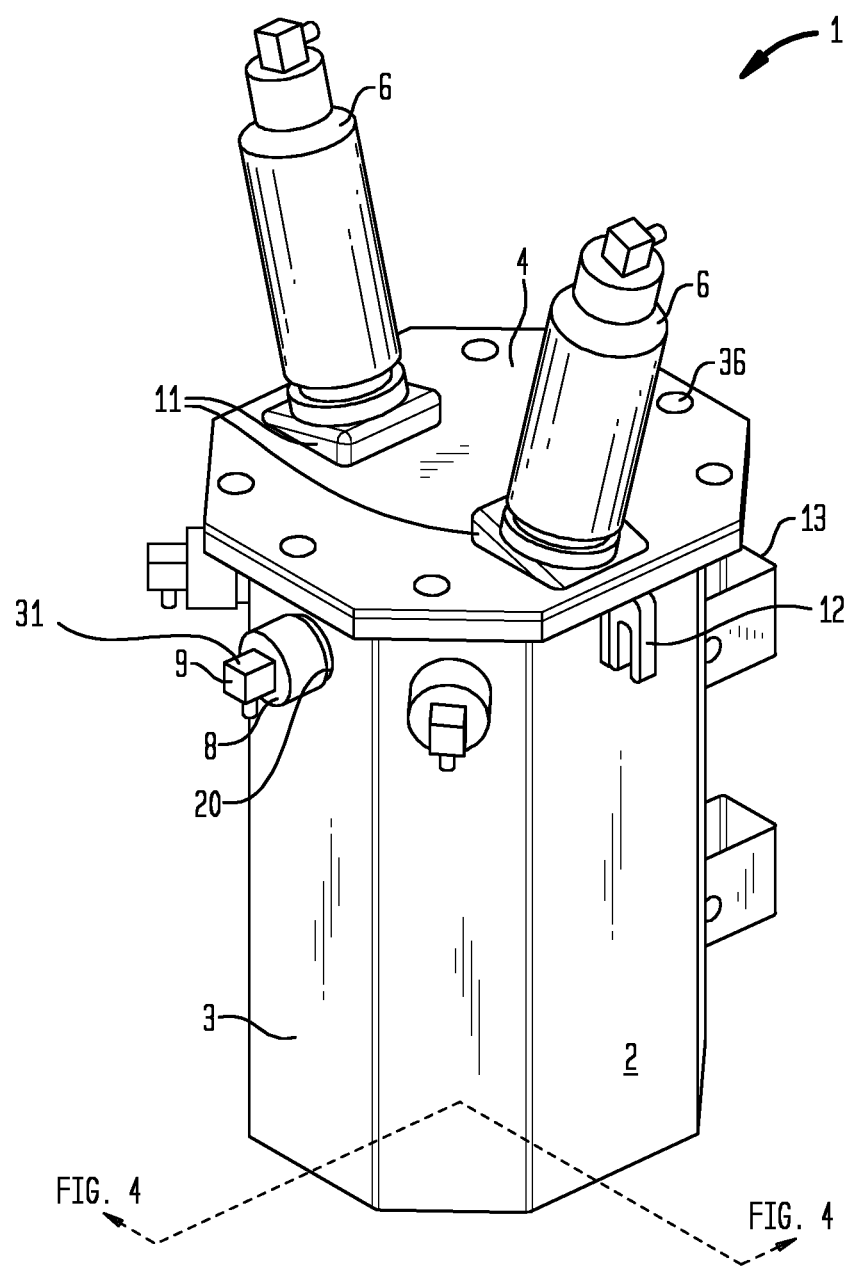
FIG. 1 illustrates an isometric view of an exemplar polymeric tank for a distribution transformer.

Shown in FIG. 1 is an embodiment of the present invention of a tank of a distribution transformer 1. It should be understood that the reference to a distribution transformer is illustrative and should not be construed as limiting. It is well within the scope of the present invention to include any electrical or power component requiring the use of the present invention to install, remove, locate, secure and maintain such electrical components in place. Moreover, although exemplary embodiments will refer to gas or fluid-filled tanks, the present invention is also applicable to dry type tanks such as dry transformers.

FIG. 1 illustrates a tank 2 for power components and in particular, a tank 2 for a distribution transformer 1. The distribution transformer tank 2 comprising one or more walls 3, a top cover 4, a bottom cover 5, protuberances 20 and protuberances 8. The tank 2 may comprise one continuous wall 3 such as a circular or elliptical wall 3 or a plurality of walls joined together. More often, the tank 2 is configured in a round, rectangular, hexagonal or octagonal shape. In the following embodiments, reference will be made to walls 3 due to the plurality of sides shown in the figures. The tank 2 is preferably made from a non-corrosive, non-conductive and non-magnetic material such as various well known polymers such as plastics and resins which are relatively light weight and have considerable structural strength. In particular, and in a preferred embodiment of the present invention, the tank 2 is preferably made from polyamides (PA), polyesters such as polycarbonate (PC), polybutylene terephthalate (PBT) or polyoxym ethylene (POM) and other plastic like substances whose characteristics can be selected and mixed to acquire the necessary strength, flexibility, insulation, temperature resistance and moldability. More specifically, the plastic selected should preferably be oil-resilient, and have a high dielectric and mechanical resilience.

In one form of the present invention, walls 3 and the bottom cover 5 are preferably integrally made as a one piece unit. In the manufacture of the walls 3 and the bottom cover 5, it is anticipated that a mold be used during the manufacturing process to create one unitary piece. In this manner, the unitary construction will enhance the manufacture of a leak proof tank 2. The top cover 4 can be later attached to the upper rim of the walls 3 via various connection techniques such as mechanical fasteners, including but not limited to hinges, latches, detents, belts, screws, bolts, nuts, rivets, pins, adhesives, solvents and various welding techniques.

For example, the top cover 4 and the rim of the walls 3 can be joined by fusion bonding in which the top cover 4 and the rim of the walls 3 are juxtaposed and heat is applied (in various forms) to the joint between the top rim of the walls 3 and the top cover 4 in order to plasticize the two parts and then allowed to cool to form a bond. And yet still, the top cover 4, may be joined to the rim of walls 3 by solvent bonding, vibration and ultrasonic welding, adhesive welding, and the like. Note that the joining of any part of the tank 2 may be joined by any of the above techniques or any other technique. The choice of the means for joining the top cover 4 with the rim of walls 3 will in large part be based on the anticipated environment and expected operational characteristics that may necessitate the selection of a hermetically sealed or dry type housing.

For example, if it is anticipated that subsequent access to the internal active components of the transformer will be needed, reversible means should be considered, such as bolts and other mechanical fasteners referenced above which can be removed and then re-installed again. As shown in FIG. 1, the top cover 4 and the rim of walls 3 are in one embodiment bolted together by means of nuts 35 and bolts 36 and/or a belt 30.

Figure 2:
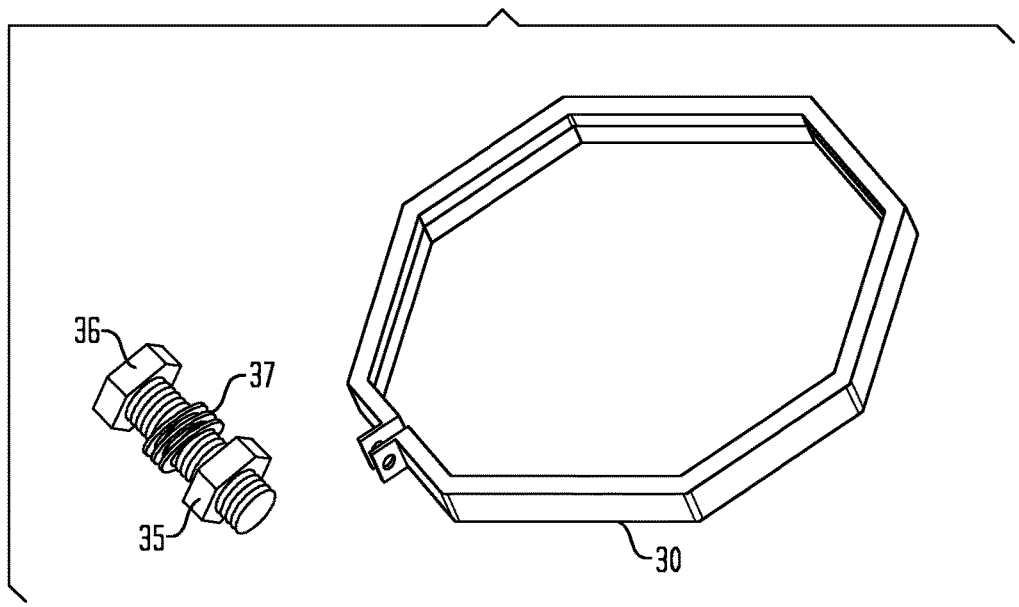
FIG. 2 illustrates an isometric view of a compression belt for securing a housing and top cover.
Figure 3A:
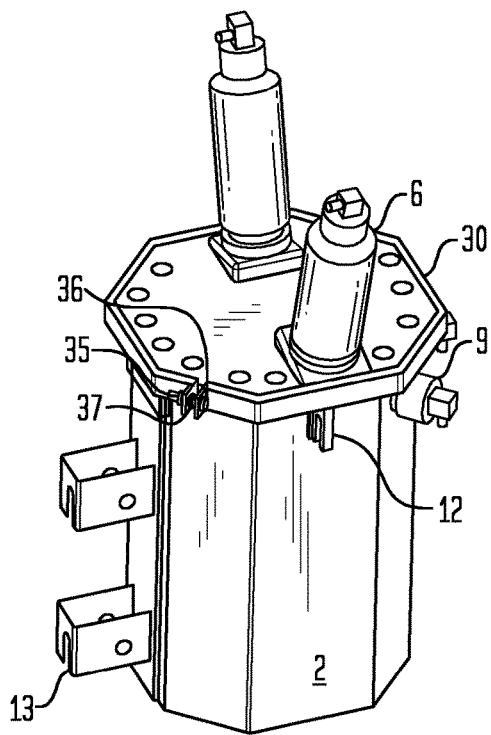
FIG. 3A illustrates an isometric view the compression belt of FIG. 2 installed between the top cover and the housing and a corresponding side profile.
Figure 3B:
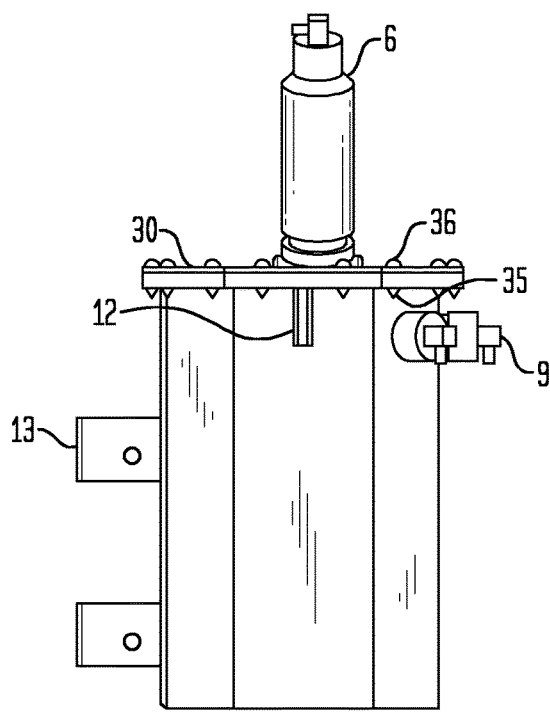
FIG. 3B illustrates a side view the compression belt of FIG. 2 installed between the top cover and the housing.

In a preferred method of securing the top cover 4 and the tank 2, a compression belt 30 either alone or in combination with other fastening means such as the nuts 35 and bolts 36 shown in FIGS. 3A and 3B may be used. The compression belt 30 shown in FIG. 2 is preferably made of metal or plastic and used to surround the rims of both top cover 4 and walls 3. The compression belt 30 may also be tightened by using other tightening means such as a latch to bring both ends of the compression belt 30 together. Preferably however, and as shown in FIG. 2 the compression belt 30 may be tightened by a nut 35 and bolt 36. To facilitate removal of the belt, the nut 35 and bolt 36 are spaced apart by a compressible spring 37 that will aid in the separation of the compression belt 30 ends when the nut 35 and bolt 36 are loosened.

In an alternative design, top cover 4 and walls 3 are manufactured as an integral unit, and whereby the power component such as the content of the distribution transformer 1 is placed on top of the bottom cover 5. Thereafter the top cover 4 and the walls 3 as a unit are placed over the power components and the bottom cover 5 and the bottom rim of the walls 3 are then joined in similar fashion to various joining techniques referenced above or as known to those skilled in the art. This alternative however, is more applicable to designs which incorporate lighter power components that are more maneuverable within the housing walls 3 and/or which require a dry type housing.

As further shown in FIG. 1, the top cover 4 comprises one or more protuberances 11 for securing high voltage bushings 6. The protuberances 11 are preferably made integral or unitary with to the top cover 4. In this design, the high voltage bushings 6 of the type shown in FIG. 1 may be joined to the protuberances 11 in a variety of ways, including but not limited to the use of threads on the bushings 6, and complementary threads on the inner surface of the opening of the protuberances 11 (not shown). Moreover, the high voltage bushings 6 may be joined to the protuberances 11 via flanges (not shown) on the high voltage bushes 6 which can then be joined to the top surface of the protuberance 11 via various fastening techniques as previously described.

Alternatively, the high voltage bushings 6 may be made integral with the top cover 4. More specifically, the high voltage bushings 6 may be set within a mold used to create the top cover 4. Plastic type material may be injected within the mold to engulf a portion of the lower part of the high voltage bushing 6. The terminals at either end of the high voltage bushings are not covered by the plastic like material. In this manner, replacement of the high voltage bushings 6 and the top cover 4 can be completed by the substitution of an already installed and integrally formed high voltage bushing 6 and top cover 4.

To minimize, the potential for electrical discharge between the high voltage bushings 6, the protuberances 11 and high voltage bushings 6 are angled away from each other. The protuberances 11 are integrally designed with the top surface of the top cover 4 to be manufactured in a slanted orientation.

On the outer surface of walls 3, one or more side mounts 12 may be made integral to the walls 3. The side mounts 12 are preferably made of similar material to walls 3, although depending on the size and weight of the components within the tank 2, the side mounts 12 can be made of or reinforced with metal with preferably an insulating coat around the outer surface of the side mounts 12. In FIG. 1 the shape of the side mounts 12 is an inverted U, although it should be noted that these side mounts 12 may be made in various shapes to accommodate the lifting and movement of the distribution transformer. For example, the side mounts 12 may take the shape of O rings or T shaped protrusions that may easily engage with positioning cables.

These side mounts 12 function as a means of transport and means of installing the distribution transformer 1. Moreover, they may also function as a means of further securing the distribution transformer 1 in place by using the side mounts 12 as an attachment point for attaching a securing line between the distribution transformer 1 and a pole.

In addition to the high voltage bushings 6, the outer surface of the walls 3, may accommodate one or more low voltage terminals 9 (secondary terminals) for connection to a low voltage power line used to feed power to a consumer. The low voltage terminals 9 may be positioned anywhere on the outer surface of the walls 3, although by convention and under certain circumstances in compliance to local regulatory standards, these low voltage terminals 9 are preferably placed at the front of the distribution transformer tank 2 and at sufficient distances from each other so as to render access to these low voltage terminals 9 to be in a safe and accessible manner.

Figure 4:
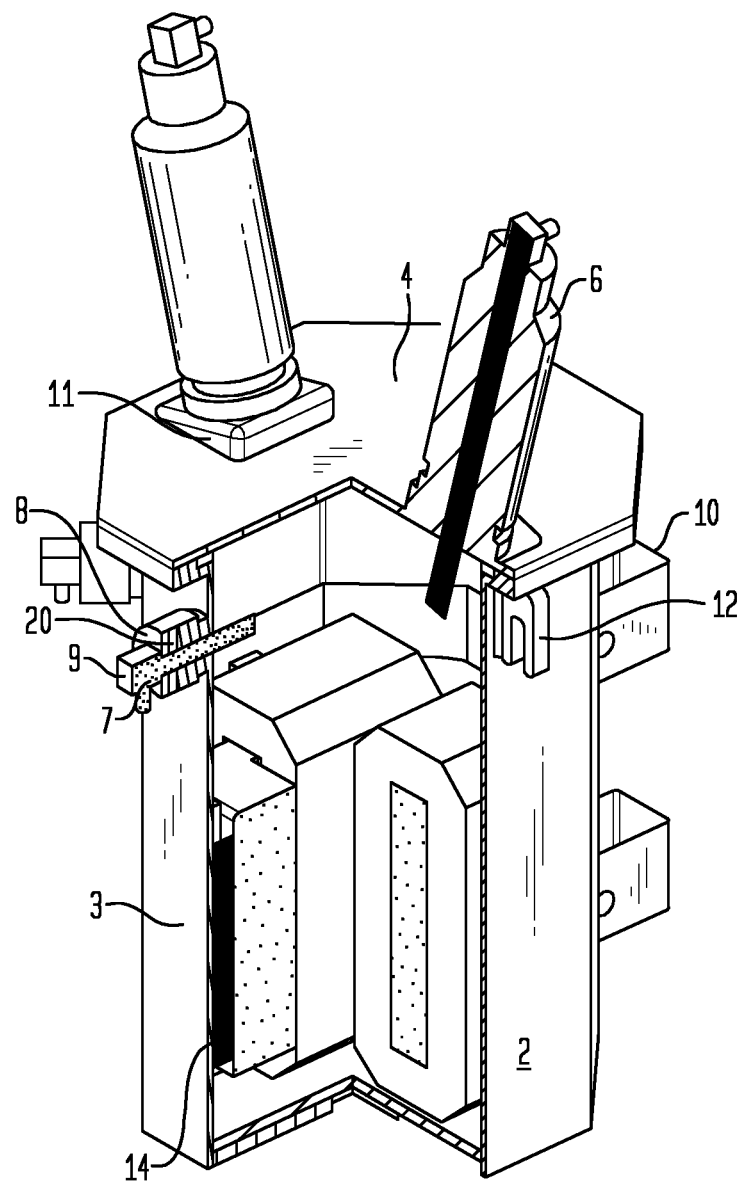
FIG. 4 illustrates an exemplar polymeric tank with a portion removed along reference line A-A of FIG. 1.
Figure 5:
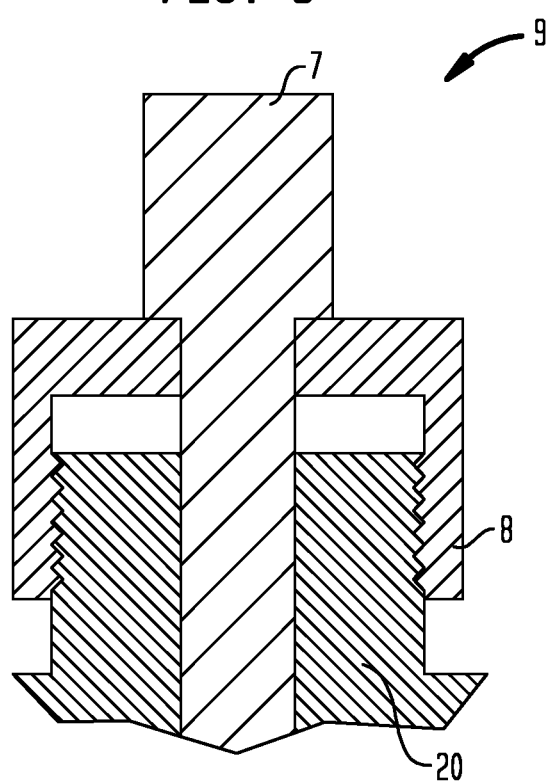
FIG. 5 illustrates a cross-sectional view of a low voltage terminal along reference line B-B of FIG. 7.

It should be noted in one embodiment of the present invention, the connection point of the low voltage terminals 9 with the tank 2 occurs by way of a threaded protuberances 20. As shown in FIGS. 4 and 5, protuberances 20 are preferably integral to the walls 3 of the tank 2. In the present embodiment three protuberances 20 are positioned at the upper front outer portion of wall 3. A conductor 31 is placed through an opening of a screw cap 8 and the screw cap 8 is then screwed onto the threaded protuberance 20 so as to form a tight seal. The seal between the screw cap 8 and the protuberance 20 is further enhanced by the use of optional O rings (not shown) between the screw cap 8 and the protuberance 20.

Alternatively, the protuberance 20 may comprise a socket within the opening of protuberance 20. The socket may be made of metal and configured to mate with the outer lower surface of a low voltage terminal 9 as are known in the industry. The mating of the low voltage busing 9 and protuberance 20 are may be of the type known as plug and socket bushings. The bushings 6 and low voltage terminals 9 may be connected to the top cover 4 and walls 3 by any of the above connecting techniques such as threads, flanges and plug and sockets. Moreover, the low voltage terminals 6 may likewise be molded into the walls 3 as were described above with reference to the bushings 6 and protuberances 11.

Pole brackets 13 (see FIG. 6) are primarily used in the event that the tank 2 is being placed on a pole without a base platform. Platforms installed power components such as distribution transformers 1 may be located on the ground or a platform above the ground that is attached to a pole. In such platform installations, the pole brackets 13 are not necessary, although in many cases such pole brackets 13 are nevertheless used to further secure heavier loads on the pole.

Shown in FIG. 4 is a sectional view of the distribution transformer 1 of FIG. 1 along 90 degree reference line A-A. The exposed section of the distribution transformer 1 shows the windings 22 and core 21 of the distribution transformer 1. In addition, FIG. 4 shows a side view of a mounting receptacle 14 on the inner surface of walls 3. As will be detailed infra, the use a mounting receptacle 14 is used as a positioning and securing means for the installation of the core 21 and windings 22 of the distribution transformer 1 as well as other power components. Alternatively and depending on the equipment to be installed in tank 2, one or more mounting receptacles 14 may be used to position and secure the power components. Furthermore, the mounting receptacle 14 may be used as a guide to install an electromagnetic shield 18. The details of the mounting receptacle and corresponding plug(s) 15 will be further discussed below.

Figure 6:
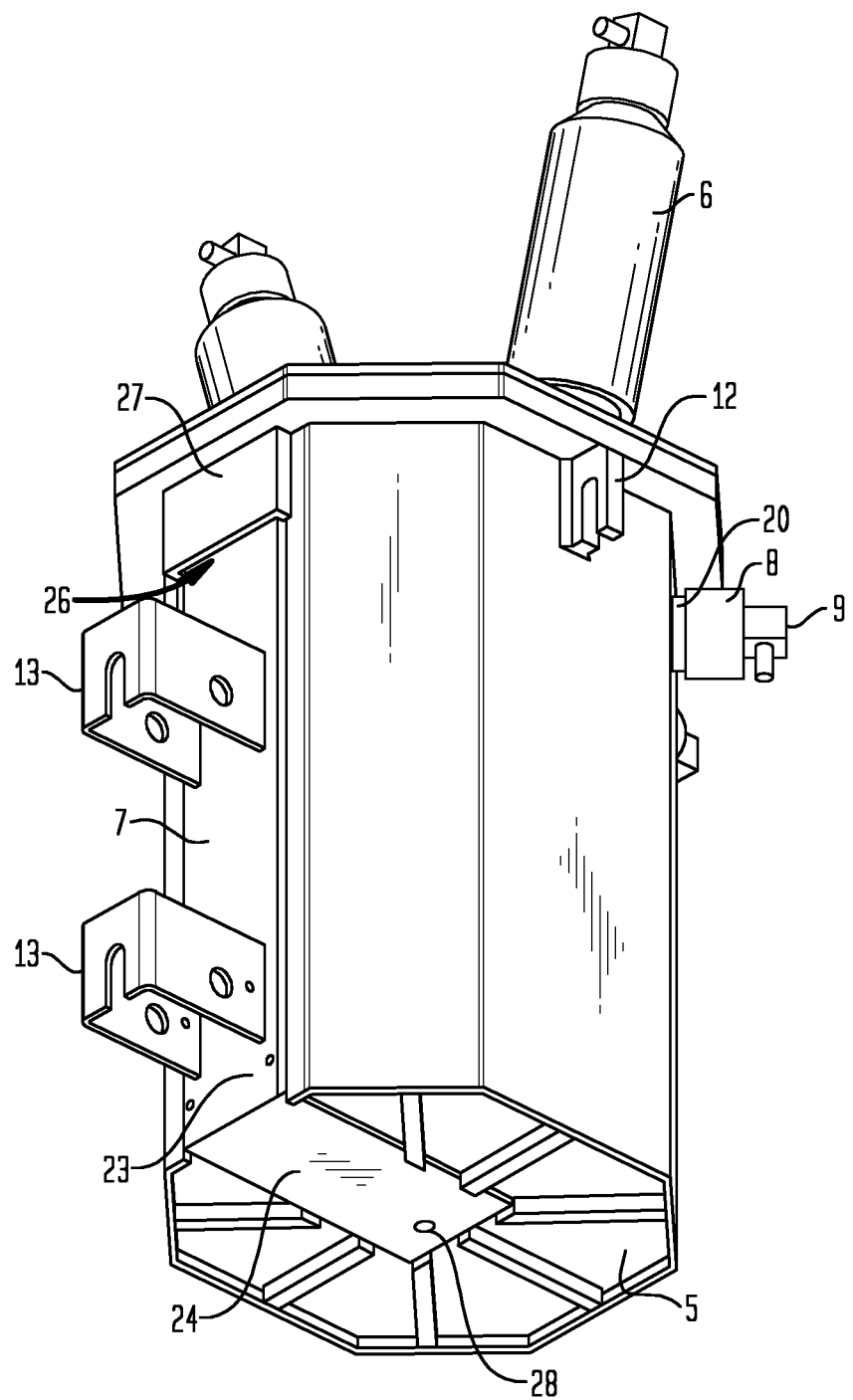
FIG. 6 illustrates an isometric and anterior view of the exemplar polymeric tank with installation support structures.

Shown in FIG. 6 is a rear view of the distribution transformer 1 with pole brackets 13 mounted on the support strap 7. Support strap 7 in the embodiment shown in FIG. 6, is configured in an L-shape to provide structural strength and support to the tank 2. The support strap 7 may be made from various materials, provided they can provide the structural strength necessary to support the weight of the housing, dielectric fluids, and the internal and external components attached thereto.

In a preferred embodiment the support strap 7 is made from preferably a metal such as steel and coated with an insulating layer such as silicone, plastic, or resin. The coating is intended to protect the supporting strap 7 from conducting a current and from the environment. Alternatively, and if the weight of the components to be included in the tank 2 is not excessive, the support strap 7 may be made of a non-conductive, non-corrosive, and non-magnetic material such as the polymers referenced above with respect to the composition of the tank 2. Should the support strap 7 be made of the same material as that of the tank 2, the support strap 7 is preferably made integral with the tank 2.

The support strap 7 may be installed by inserting the end of a vertical leg 23 into a slot 26 of a back stop 27. The back stop 27 may be made of metal or any other material capable of securing the end of the vertical leg 23. In FIG. 6, the end of the vertical leg 23 may be secured to the back stop 27 by a myriad of fastening means such as screws, plugs, nuts, bolts, pins, and rivets etc. Preferably, the back stop 27 may be made of the same material as walls 3 and be manufactured as an integral part of wall 3 and bottom cover 5.

The horizontal leg 24 of the support strap 7 may likewise be secured to the bottom cover 5, by the use of any of the fastening means referenced above. Alternatively, the bottom cover 5 may include a bottom cover projection 28 that enters a hole 32 or opening in the horizontal leg 24 of the support strap 7. The bottom cover projection 28 is preferably engaged to the hole 32 of the horizontal leg 24 in a friction fit manner. If other support straps 7 are used, the length of bottom cover projection 28 may need to be extended to accommodate additional support straps 7.

In an alternate embodiment, the tank 2 may be supported by more than one support strap 7, placed about the circumference of the bottom cover 5. For example, a second support strap 7 may be positioned at 90 degrees to the left or right of the support strap 7 shown in FIG. 3. The addition of other support straps 7 enhances the structural strength of the housing while securing the housing and internal power components in place. Corresponding back stops 27 should be added to the outer surface of walls 3 for each additional support strap 7 used.

Figure 7:
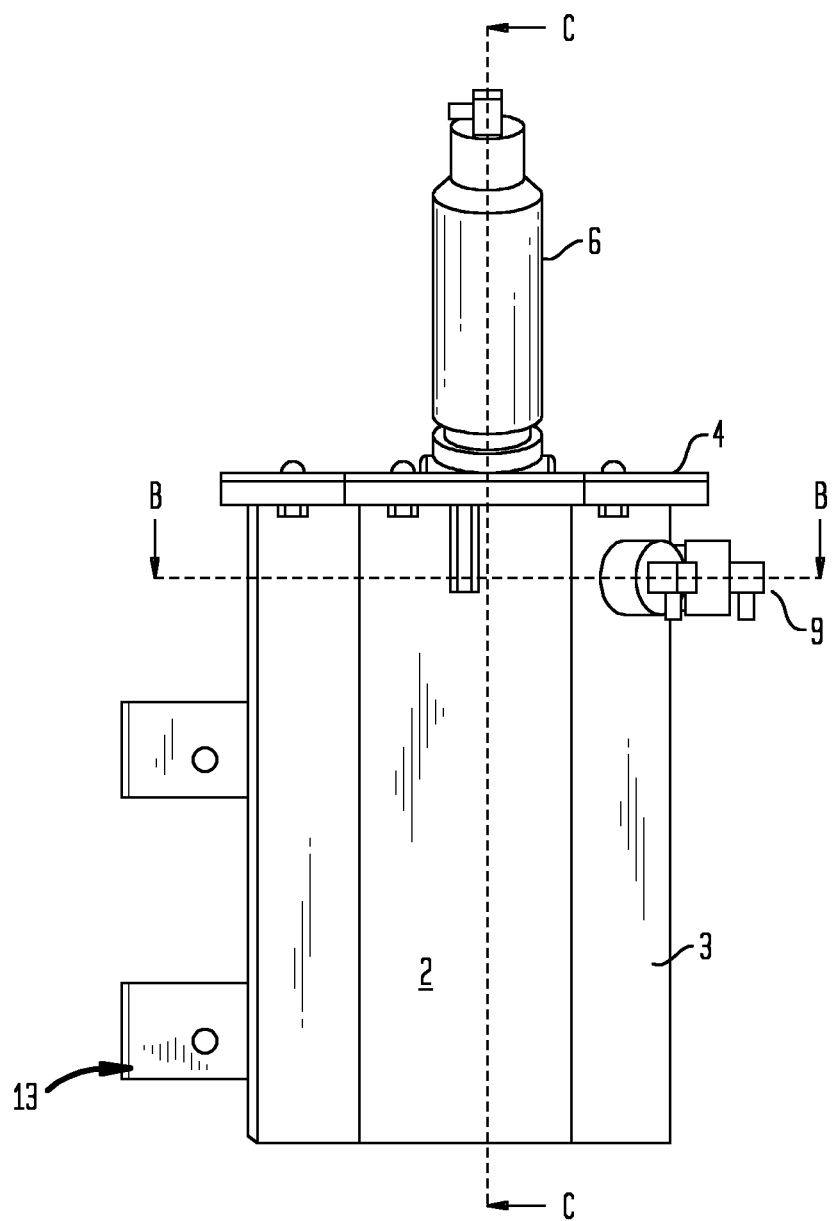
FIG. 7 is a side view of the distribution transformer of FIG. 1
Figure 8:
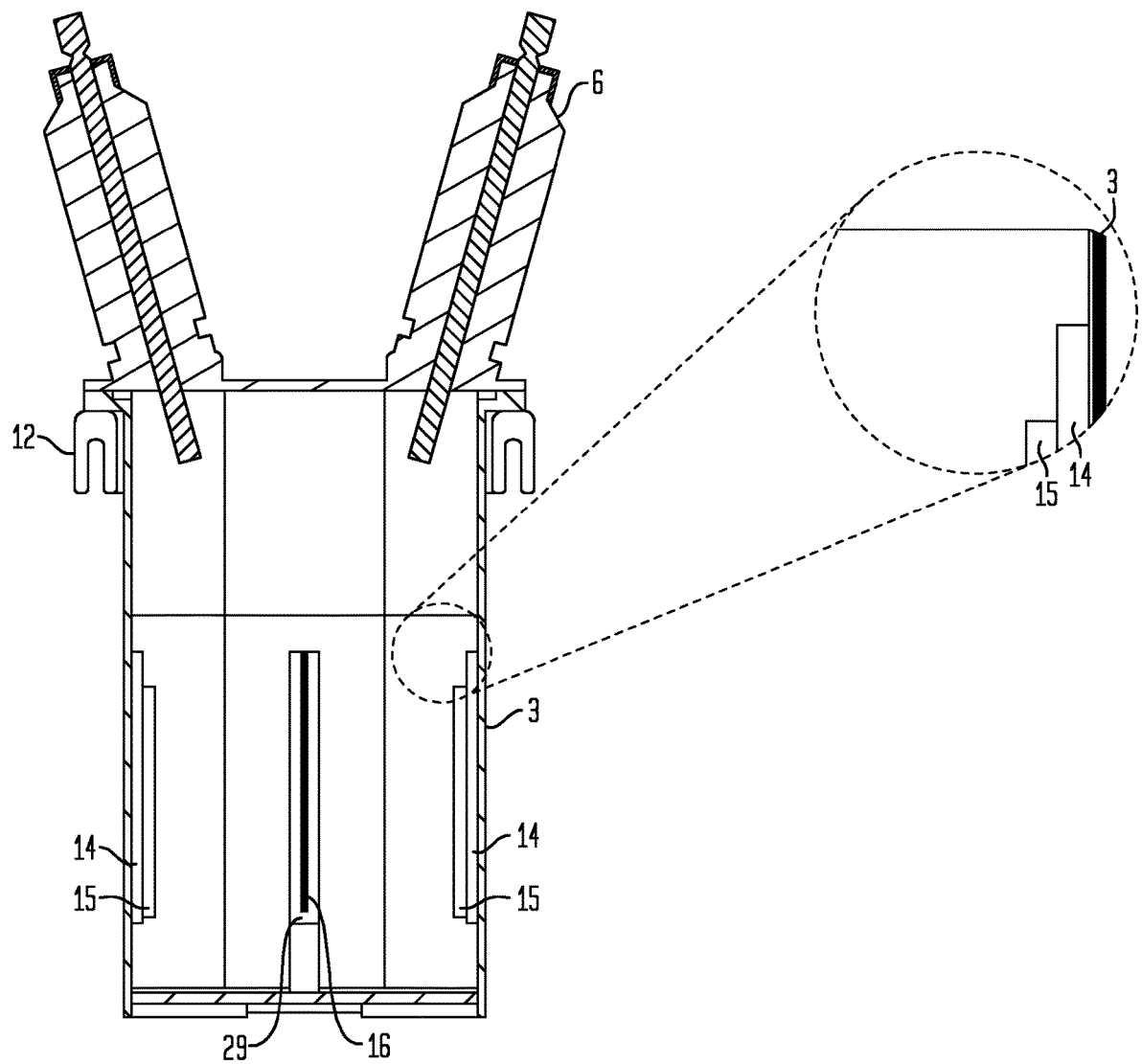
FIG. 8 illustrates a cross-sectional view of the distribution transformer of FIG. 7 along reference line C-C without the power components.

FIG. 7 is a side view of the distribution transformer 1 of FIG. 1. FIG. 8 is cross sectional view of FIG. 7 along the reference plane C-C without the power components. Mounting receptacle 14 and plug 15 are shown on the left and right walls 3. The center wall 3 comprises a mounting receptacle 14 without the associated plug 15 to better view channel 16 and ridges 29.

Figure 9:
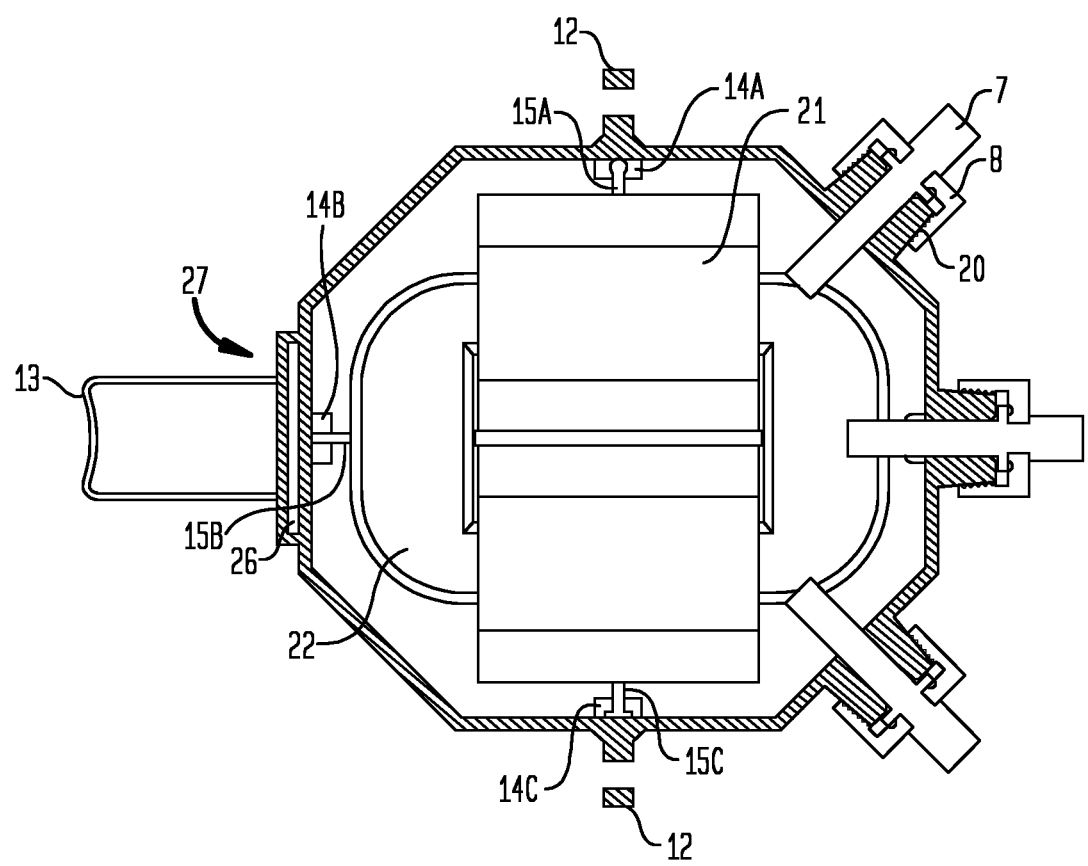
FIG. 9 illustrates a top cross sectional view of the distribution transformer of FIG. 7 along reference line B-B.

FIG. 9 shows a top cross sectional view of distribution transformer 1 of FIG. 7 along the plane of reference B-B. Shown are the core 21 and windings 22 of the distribution transformer 1 and the use of three (3) mounting receptacles 14 and plugs 15 (14a-c, 15a-c in FIGS. 10-12) to position and to secure the power components of the distribution transformer 1 in place. For illustration purposes, each of the three (3) mounting receptacles 14a-c and plugs 15a-c are configured with a different geometric designs—although similar or dissimilar geometric designs may be used to secure power components within the tank 2.

The mounting receptacle 14 and the plug 15 serve two primary functions. During a preferred method of installation of the power components, the bottom cover 5 and the walls 3 already contain the power components to be enclosed. The plug(s) 15 are thereafter inserted within channel(s) 16 and are lowered into place such that the longitudinal sides of the plugs 15 either contact or almost contact the power components. Under these circumstances, the power components, may move slightly or not at all. Depending on the clearance or spacing available between the channels 16 and the power components, the plugs 15 may need to be inserted with minimal effort or with some applied force. In some cases, the plugs may be pounded with a hammer to ensure a snug fit. In such a manner the plug(s) 15 and mounting receptacle(s)

14 serve to properly secure the power components into the distribution transformer housing.

Alternatively, the plugs 15 may be attached to the power components before installation into the tank 2. The plugs 15 are positioned along the exterior surface of the power components and may be attached to frames or supporting structures of the power components. In such a manner, the mounting receptacles 14 and the plugs 15 not only serve as a means for securing the power components but also, serve as a means for guiding the installation of the power equipment within the walls 3 and bottom cover 5. The plugs 15 are positioned into corresponding channels 16 and lowered. Once installed, the mounting receptacle 14 and plug 15 serve to lock in place such power components to minimize or prevent movement. Accordingly, such an arrangement tends to minimize or prevent the potential hazard of having active power components coming into contact with each other.

Figure 10:
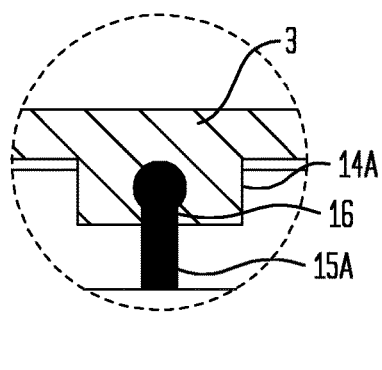
FIG. 10 is an enlarged view of a circular end plug and mounting receptacle pair used to secure the power components within the housing.
Figure 11:
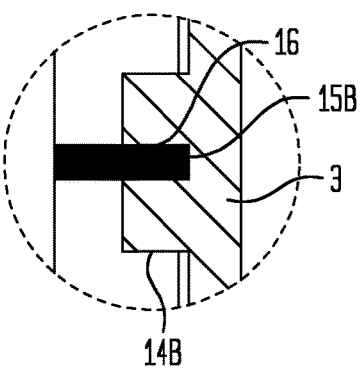
FIG. 11 is an enlarged view of a straight end plug and mounting receptacle pair used to secure the power components within the housing.
Figure 12:
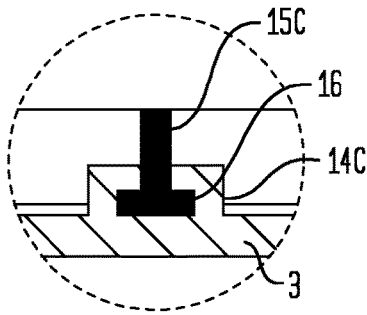
FIG. 12 is an enlarged view of a T end plug and mounting receptacle pair used to secure the power components within the housing.
Figure 13:
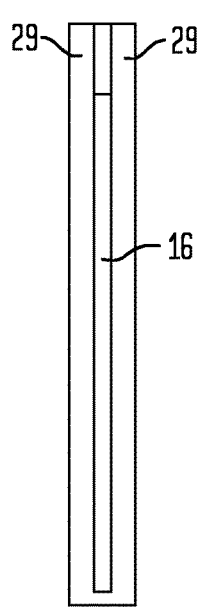
FIG. 13 illustrates a front view of an exemplar mounting receptacle without an associated plug.
Figure 14:
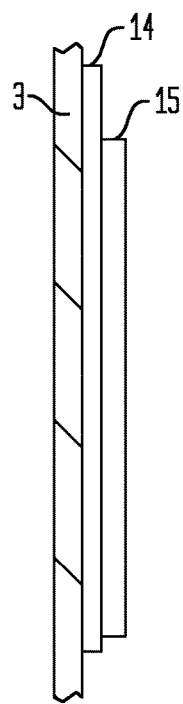
FIG. 14 illustrates a side view a mounting receptacle and plug and housing wall.

Embodiments of the mounting receptacle 14 and plug 15 pairs are shown in FIGS. 10-12. The plug 15 and corresponding mounting receptacle 14 are configured to mate with each other by preferably having complementary contours such that the shape of the plug 15 fits within the surface of channel 16. As shown in FIGS. 9-14, channel 16 is created between two raised sections or ridges 29 from the inner surface of the walls 3. Preferably the two ridges 29 are made from the same material and are integral to the inner surface of walls 3. As such, one or more mounting receptacles 14 may be used within each tank 2.

Complementary to the mounting receptacle 14 is a corresponding mating plug 15. The plug 15 may take the form of various shapes depending on the desired function. (see FIGS. 10-12 and FIGS. 15-17) Plug 15 is preferably configured in the form of a vertical slat which can mate with the walls of channel 16 although plug 15 may also be configured in a comb like fashion wherein one or more teeth 33 may be used to mate with channel 16 of mounting receptacle 14. (see FIGS. 20 and 21). Preferably plug 15 is made from a non-corrosive, non-conductive and non-magnetic material such as various well-known polymers such as plastics and resins which are relatively light weight and have considerable structural strength.

The plug 15 is in an alternate embodiment connected to the winding 22, core 21, or other power component by attaching the plug 15 to a frame, mandrel or support structure attached to the power components, or some other device which can support and connect the plug 15 to the frames or supporting structures of the power components of the distribution transformer 1. As a consequence, the pre-attached plugs 15 to the power components may function not only as a securing means, but a means to guide in the placement or installation of the power components in the tank 2.

Figure 15:
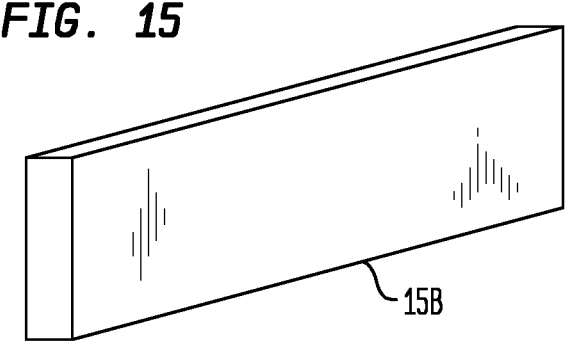
FIG. 15 is an isometric view of a straight end plug.
Figure 16:
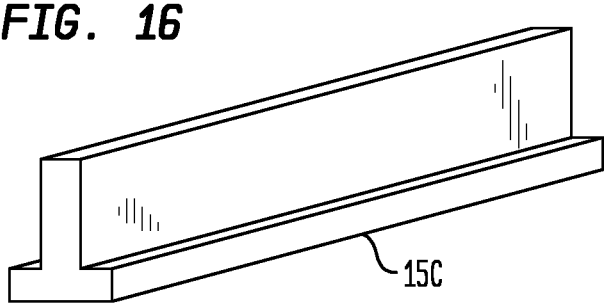
FIG. 16 is an isometric view of a T end plug.
Figure 17:
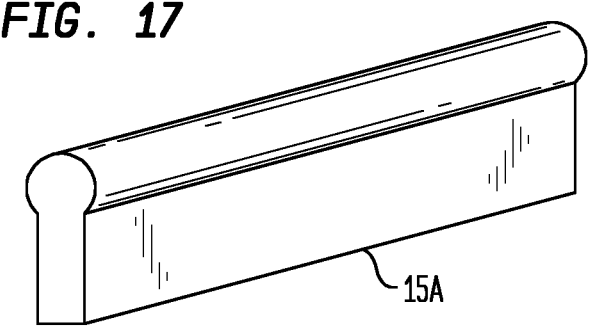
FIG. 17 is an isometric view of a circular end plug.

To secure the power components in place, the outer surface of the plug 15 should substantially correspond to the inner mating surface of channel 16 between ridges 29 to create a locking fit between the plug 15 and the mounting receptacle 14. As shown in FIGS. 10-12, the plug 15 and channel 16 may take complimentary forms such as a "T" end (15c FIG. 12) or circular end (15a FIG. 10) or straight end (15b FIG. 11) configuration. It should be understood however that the geometric shape of the plug 15 and channel 16 should not be limited by the specific shapes shown herein. Any shape capable of creating a complimentary fit between the plug 15 and channel 16 may be used. Shown in FIGS. 15-17, are the three dimensional slat versions of the plugs 15 of shown in FIGS. 11-12.

Figure 18:
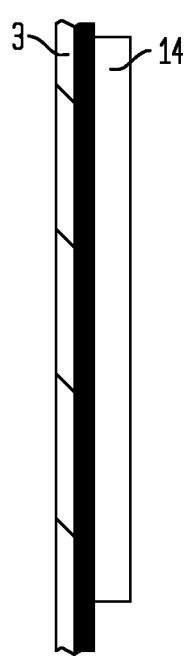
FIG. 18 is a cross sectional view of a wall and associated mounting receptacle without a plug.
Figure 19:
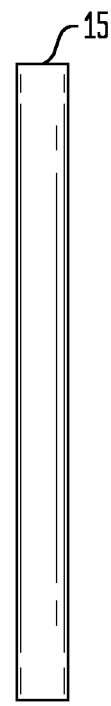
FIG. 19 is a side view of a straight end plug in a slat form.
Figure 20:
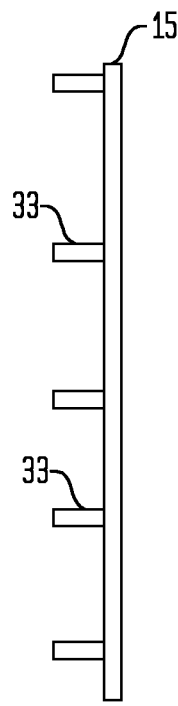
FIG. 20 is side view of a straight end plug in a comb form.
Figure 21:
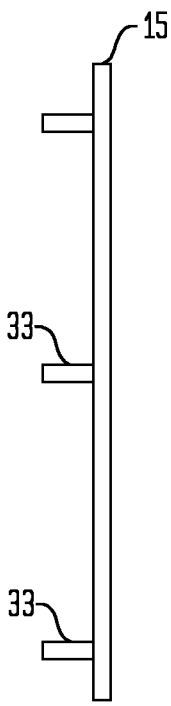
FIG. 21 is a side view of another variation of a straight end plug in comb form.

FIG. 18 shows a side view of mounting receptacle 14 without a corresponding plug 15. The plugs 15 as shown in FIGS. 19-21, are configurational variations to the geometries already shown in FIG. 9, and FIGS. 10-12. Although the slat shape of plug 15 in FIG. 19 is a preferred slat configuration, the plug 15 may alternatively incorporate the use of projections or teeth 33 (FIGS. 20-21) to mate with a complementary shaped channel 16. The teeth 33 of FIGS. 20-21 may incorporate the T, circular or straight configuration of slat plugs 15 of FIG. 15-17 or any other end configuration.

Figure 22:
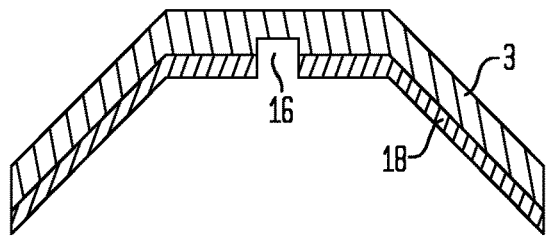
FIG. 22 is a cross-sectional view of a shield and housing wall having a channel below the surface of the interior wall.

Alternatively, and as shown in FIG. 22 and depending on the thickness of the walls 3, the mounting receptacle 14, can be made by the creation of a channel 16 below the interior surface of the walls 3, by either removing material from the channel after manufacture or by having the walls 3 molded with a channel 16 created below the interior surface of walls 3 during the manufacturing process.

Figure 27:
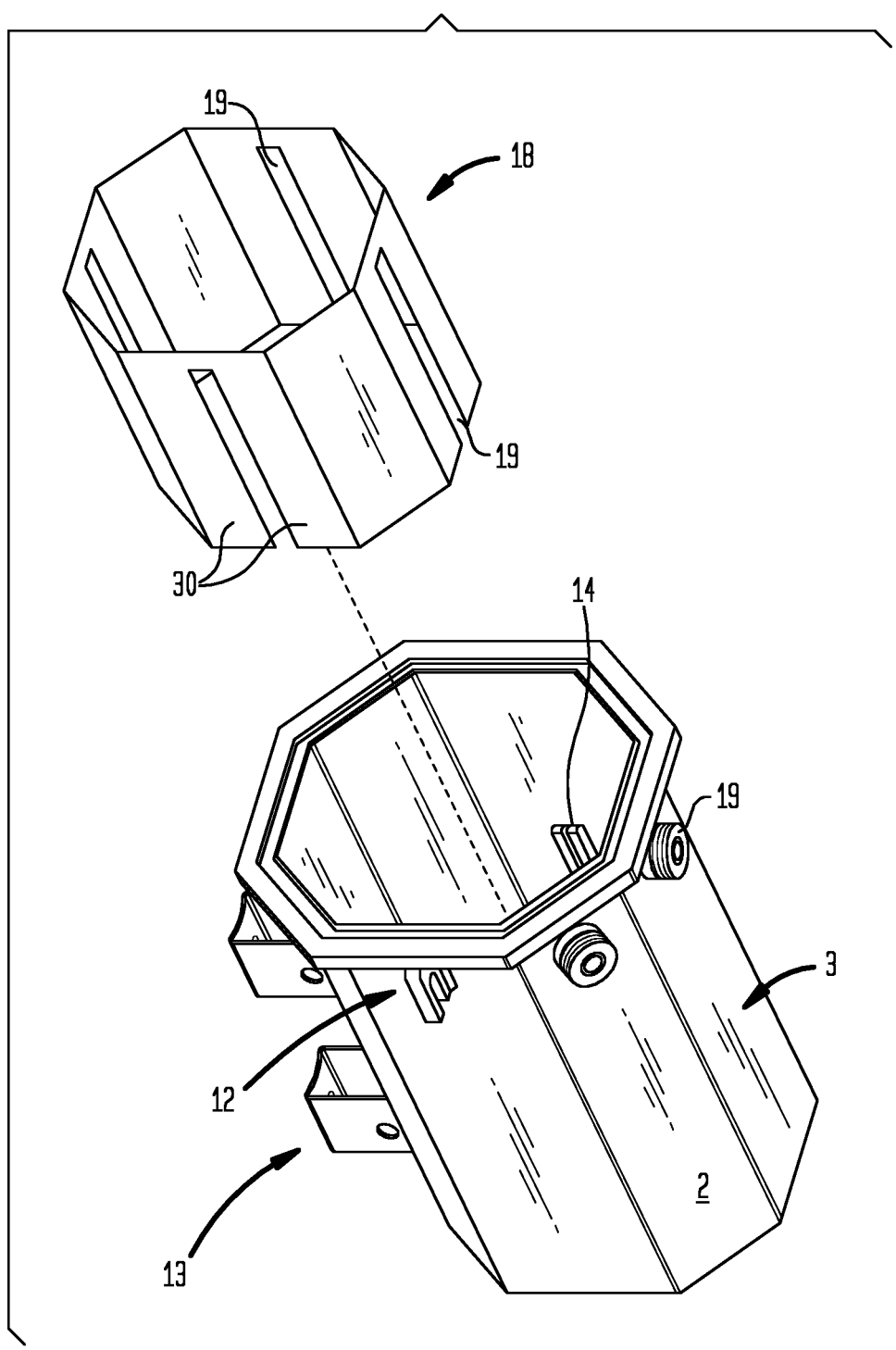
FIG. 27 is an exploded view of the distribution transformer housing and shield without the power components.

Shown in FIG. 27 is an exploded view of walls 3 and an insertable barrier or shield 18. The shield 18 is used to keep or minimize the electromagnetic field ("EMF") outside of the tank 2. To achieve such EMF shielding, shield 18 may be comprised of metallic substances having a high degree of permeability such as nickel, iron, copper, chromium, molybdenum, gold, aluminum, steel, silicon steel or any combination thereof. For example, a known shielding material is the use of sheets of mu-metal alone or in combination with other materials. Mu-metal is a nickel-iron soft magnetic alloy with a very high permeability which is well known for its ability to shield electronic equipment from static or low-frequency magnetic fields.

Figure 23:
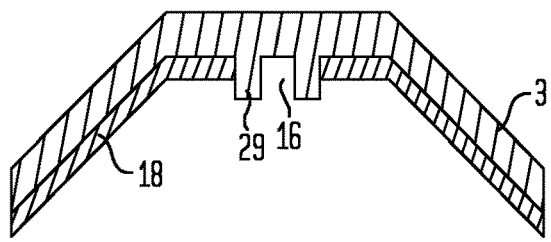
FIG. 23 is a cross-sectional view of a shield and housing wall having a channel above the surface of the interior wall.

The shield 18 in FIG. 23 may be made from such highly permeable material such as mu-metal alone or in combination with other materials capable of providing the structural strength necessary to allow the shield 18 to be inserted into tank 2 during the manufacturing process. A single solid structure of shield 18 may be inserted inside walls 3. The channel 16 is preferably integral to the interior surface of the walls 3 and formed from a pair of ridges 29 above the surface of the interior walls 3.

Figure 24:
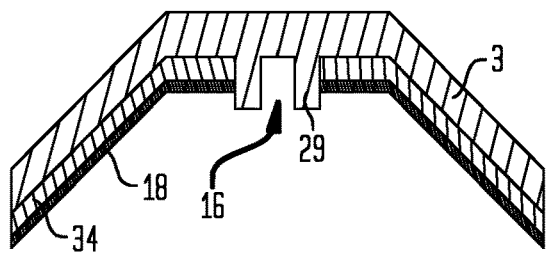
FIG. 24 is a cross-sectional view of a wall and a two layer shield comprising an exterior mold and an interior layer of permeable material within the housing wall.
Figure 25:
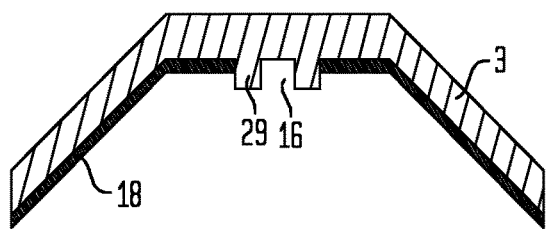
FIG. 25 is a cross-sectional view of a wall and a thin layer of a permeable material attached to the interior wall of a housing.
Figure 26:
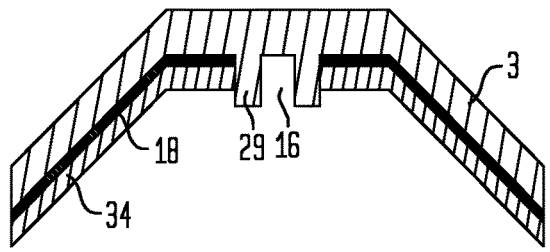
FIG. 26 is a cross-sectional view of a wall and a two layer shield comprising an interior mold and an exterior layer of permeable material within the housing wall.

In another embodiment, and as shown in FIG. 25, a thin sheet or layer of highly permeable material such as mu-metal may be applied and joined or fused to the interior surface of the walls 3. This may take the form of a foil, a metallic net, strands of metal or other conductive material capable of shielding the environment outside the tank. On the other hand, and as shown in FIG. 26 the highly permeable material may be applied to the outer surface of a mold 34 in the form of shield 18 made of non-corrosive, non-conductive, non-magnetic material. In effect the shield 18 would comprise a two layer configuration as shown in FIG. 26 in which a mold 34 is used as a base to apply a layer of highly permeable material such as mu-metal. The mold 34 may be plastic or other desirable material and serves as structural support for permeable material unable to provide the structure strength necessary to be fitted within tank 2. In similar manner, the shield 18 may be placed on the interior surface of mold 34 as shown in FIG. 24.

The shield 18 in FIG. 27 may be made in various ways and should be substantially congruent to the interior shape of the tank 2. The shield 18 may have one or more slits 19 as a means of mounting the shield 18 to the interior surface of the tank 2. The shield 18 may be lowered inside the tank 2 with corresponding slits 19 being positioned such that the slits 19 are wide enough to accommodate the perimeter of the mounting receptacle 14. In a preferred embodiment, the slits 19 are complimentary in perimeter to the exterior perimeter of the mounting receptacle 14.

In a preferred embodiment of the invention, shield 18 is preferably comprised of slits 19 corresponding to the number of mounting receptacles 14. In the embodiment shown in FIG. 8, three (3) mounting receptacle 14 and plug 15 pairs are shown. In FIG. 27 however, tank 2 is configured as an eight (8) sided or walled housing, with only 6 mounting receptacle 14 and plug 15 pairs. Two of the sides or walls 3 do not include a mounting receptacle 14 and plug 15 pairs. The selection of the number of mounting receptacle 14 and plug 15 pairs is a matter of design choice based on the type of power components and dielectric to be housed. In certain instances, one mounting receptacle 14 and plug 15 pair can be used for each available segment of the housing walls 3. In some cases, the unused walls space as shown in FIG. 15 may be installed with additional mounting receptacle 14 and plug 15 pairs. Each additional pair may be used to secure and install other power components that are peripheral to the main power components such the core and windings.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

The foregoing description discloses only exemplary embodiments of the invention. Modifications of the above disclosed embodiments which fall within the scope of the invention will be readily apparent to those of ordinary skill in the art. For example, although the examples discussed above are illustrated for a power transmission and distribution market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A tank for housing a power component comprising:
an integral polymeric housing having a bottom cover and a wall;
a mounting receptacle integrally connected to the wall, the mounting receptacle having a channel formed below an interior surface of the wall;
an insertable plug configured to mate with the channel, wherein an axial length of the insertable plug extends away from the interior surface of the wall of the integral polymeric housing and beyond the mounting receptacle to provide a spaced-apart relationship between the wall of the integral polymeric housing and a corresponding exterior surface of the power component;
a top cover connected to the housing; and
a permeable shield configured to be insertable within the housing,
wherein the permeable shield comprises an opening configured to allow the plug to mate with the channel of the mounting receptacle.

2. The tank of claim 1 wherein the channel of the mounting receptacle is shaped in a complementary form to an end of the plug.

3. The tank of claim 1 wherein the channel of the mounting receptacle is formed by the removal of material from the interior surface of the wall.

4. The tank of claim 1 wherein the shield is comprised of a polymeric mold connected to a layer of permeable material.

* * * * *